(12) United States Patent
Toeroe

(10) Patent No.: US 11,861,391 B2
(45) Date of Patent: *Jan. 2, 2024

(54) METHOD FOR COORDINATING INFRASTRUCTURE UPGRADE WITH HOSTED APPLICATIONS/VIRTUAL NETWORK FUNCTIONS (VNFS)

(71) Applicant: TELEFONAKTIEBOLAGET LM ERICSSON (PUBL), Stockholm (SE)

(72) Inventor: Maria Toeroe, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,150

(22) Filed: Jun. 14, 2022

(65) Prior Publication Data
US 2022/0326978 A1    Oct. 13, 2022

Related U.S. Application Data

(63) Continuation of application No. 16/618,025, filed as application No. PCT/IB2018/054177 on Jun. 8, 2018, now Pat. No. 11,403,128.
(Continued)

(51) Int. Cl.
G06F 9/455        (2018.01)
G06F 9/50         (2006.01)
(Continued)

(52) U.S. Cl.
CPC ............ *G06F 9/45558* (2013.01); *G06F 8/60* (2013.01); *G06F 8/65* (2013.01); *G06F 8/70* (2013.01);
(Continued)

(58) Field of Classification Search
CPC .. G06F 9/455; G06F 9/45533; G06F 9/45558; G06F 2009/4557;
(Continued)

(56) References Cited

U.S. PATENT DOCUMENTS 8,533,700 B1    9/2013  Feeser
10,348,825 B2 *  7/2019  Rao .................... H04L 41/40
(Continued)

FOREIGN PATENT DOCUMENTS

CN        106797323 A       5/2017
JP       2016157306 A1      4/2017
(Continued)

OTHER PUBLICATIONS

C. Makaya et al., Policy-based NFV Management and Orchestration, 2015 IEEE Conference on Network Function Virtualization and Software Defined Network (NFV-SDN).

*Primary Examiner* — Charles M Swift

(57) ABSTRACT

The disclosure relates to a method, executed in a Network Function Virtualization Infrastructure (NFVI) software modification manager, for coordination of NFVI software modifications of a NFVI providing at least one Virtual Resource (VR) hosting at least one Virtual Network Function (VNF), comprising receiving an NFVI software modifications request; sending a notification that a software modification procedure of the at least one VR is about to start to a VNF level manager, the VNF level manager managing a VNF hosted on the at least one VR provided by the NFVI; applying software modifications to at least one resource of the at least one VR; and notifying the VNF level manager about completion of the software modifications.

16 Claims, 10 Drawing Sheets

Related U.S. Application Data

(60) Provisional application No. 62/517,592, filed on Jun. 9, 2017.

(51) Int. Cl.
*G06F 9/48* (2006.01)
*G06F 9/54* (2006.01)
*H04L 45/00* (2022.01)
*G06F 8/60* (2018.01)
*G06F 11/30* (2006.01)
*G06F 8/70* (2018.01)
*G06F 8/65* (2018.01)

(52) U.S. Cl.
CPC .......... *G06F 9/455* (2013.01); *G06F 9/45533* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/5027* (2013.01); *G06F 9/5033* (2013.01); *G06F 9/5055* (2013.01); *G06F 9/5077* (2013.01); *G06F 9/5083* (2013.01); *G06F 9/5088* (2013.01); *G06F 9/542* (2013.01); *G06F 11/30* (2013.01); *H04L 45/563* (2013.01); *G06F 2009/4557* (2013.01); *G06F 2009/45591* (2013.01)

(58) Field of Classification Search
CPC ............. G06F 2009/45591; G06F 9/48; G06F 9/4806; G06F 9/4843; G06F 9/485; G06F 9/4856; G06F 9/4881; G06F 9/50; G06F 9/5005; G06F 9/5027; G06F 9/5055; G06F 9/5077; G06F 9/5083; G06F 9/5088; G06F 9/542; G06F 11/30; H04L 45/563
See application file for complete search history.

(56) References Cited

U.S. PATENT DOCUMENTS

| | | |
|---|---|---|
| 2015/0143364 A1 | 5/2015 | Anderson |
| 2015/0365288 A1 | 12/2015 | Van Der Merwe |
| 2016/0212016 A1 | 7/2016 | Vrzic |
| 2017/0116020 A1 | 4/2017 | Miller |
| 2018/0013656 A1 | 1/2018 | Chen |
| 2019/0238404 A1 | 8/2019 | Yao |
| 2019/0273668 A1 | 9/2019 | Xia |
| 2020/0259719 A1 | 8/2020 | Ni |

FOREIGN PATENT DOCUMENTS

| | | |
|---|---|---|
| WO | 2015135611 A1 | 9/2015 |
| WO | 2016121728 A1 | 8/2016 |
| WO | 2017008839 A1 | 1/2017 |
| WO | 2017058274 A1 | 4/2017 |

* cited by examiner

METHOD FOR COORDINATING INFRASTRUCTURE UPGRADE WITH HOSTED APPLICATIONS/VIRTUAL NETWORK FUNCTIONS (VNFS)

PRIORITY STATEMENT UNDER 35 U.S.C. S.119(E) & 37 C.F.R. 5.1.78

This application is a continuation of U.S. patent application Ser. No. 16/618,025, filed Nov. 27, 2019, which is a 35 U.S.C. § 371 national phase application of International Application No. PCT/IB2018/054177, filed Jun. 8, 2018, the content of which is incorporated herein by reference in its entirety, which claims the benefit of U.S. Provisional Application Ser. No. 62/517,592, filed Jun. 9, 2017, entitled "METHOD FOR COORDINATING INFRASTRUCTURE UPGRADE WITH HOSTED APPLICATIONS/VNFS".

TECHNICAL FIELD

The present disclosure relates to Network Function Virtualization (NFV).

BACKGROUND

In the cloud and the Network Function Virtualization (NFV) architecture 100 illustrated in FIG. 1, the infrastructure is decoupled from the applications or Virtual Network Functions (VNFs) 120 executing on the infrastructure 130. However, these applications/VNFs may need to provide their services/function in a highly available manner and continuously. The upgrade of the cloud/NFV infrastructure can interfere with this service high availability and continuity requirements, because, due to the decoupling, the infrastructure is not aware of the applications/VNFs running on it and the applications/VNFs are not aware of the operations at the infrastructure level.

SUMMARY

To overcome this problem and let the applications/VNFs know about the upgrade, some cloud solutions offer a notification before a compute resource (i.e. a physical host and/or its infrastructure level components) gets upgraded, so that the applications/VNFs hosted on the resource can perform some action protecting their services/functions.

There currently exist certain challenge(s). While the compute resource based notification helps, it does not provide enough perspective for application/VNF level adjustments to the infrastructure upgrade process. Such application/VNF level adjustment could be increasing the redundancy of the application/VNF for the time of the infrastructure upgrade, but for this the compute resource based notification is too fine grain and may result in oscillation as it does not provide information on the beginning and the end of the upgrade campaign. On the other hand, notification could be given at the beginning of the entire infrastructure upgrade process/campaign, which is too coarse, i.e. extra resources may be used for applications/VNFs not impacted at all or for longer times than it is necessary.

Certain aspects of the present disclosure and embodiments may provide solutions to these or other challenges. One solution is to use the anti-affinity grouping of virtual resources as the basis of an upgrade notification process. Accordingly, the infrastructure may send a notification to the manager of the application/VNF registered for the anti-affinity group before the first member of the group is impacted and, as a result, the application/VNF can be prepared for the series of impacts by, for example, reconfiguration or scale out. The infrastructure may send another notification after the last member of the group has been impacted and no more impact is expected at which point the preparedness is wrapped up and the application/VNF is scaled in. The coordination between the infrastructure and the application/VNF levels may use the anti-affinity groups.

Certain embodiments may provide more efficient application/VNF level actions in preparation to an upcoming infrastructure upgrade, avoiding the possible oscillating effect of compute resource level notifications, and providing a finer grain solution than campaign level notification using an upgrade target (i.e. anti-affinity group) known at both infrastructure and application/VNF levels.

Some embodiments may be used in combination or as an alternative to the existing solution of compute resource-based notifications. When used as an alternative, it can also reduce significantly the notification signaling.

In addition, using the anti-affinity grouping for the organization of the infrastructure upgrade can optimize the infrastructure upgrade campaign without jeopardizing the application/VNF level service availability and continuity.

There is provided a method, executed by a Network Function Virtualization Infrastructure (NFVI) software modification manager, for coordination of NFVI software modifications of a NFVI providing at least one Virtual Resource (VR) hosting at least one Virtual Network Function (VFN). The method comprises receiving an NFVI software modifications request; sending a notification that a software modification procedure of the at least one VR is about to start to a Virtual Network Function (VNF) level manager, the VNF level manager managing a VNF hosted on the at least one VR provided by the NFVI; applying software modifications to at least one resource of the at least one VR; and notifying the VNF level manager about completion of the software modifications.

At least one VR may comprise at least one VR group. The method may further comprise receiving information from the VNF level manager comprising an indication whether coordination of NFVI software modifications is necessary for a VR as well as applicable constraints. Information may further comprise an anti-affinity group. The receiving information may be subscription based or part of the VR creation process. The method may further comprise identifying impacted VRs and VR groups and an order in which software modifications of NFVI resources can be performed considering constraints imposed by the impacted VRs and VR groups. The notification to the VNF level manager may further comprise an indication whether the at least one VR is going to be live-migrated or shut down when the at least one VR is a virtual machine. The method may further comprise, at a same time as the notification is sent, starting a timer with a determined lead time, the lead time being determined as the maximum lead time imposed by constraints. The method may further comprise waiting the lead time before proceeding with the NFVI software modifications.

The method may further comprise initiating preparations for potential disruptions caused by the NFVI software modifications and, when the at least one VR is a VR group, scaling out to increase VNF redundancy. The method may further comprise initiating preparations for potential disruptions caused by the NFVI software modifications and, when the at least one VR is a VR group, switching an active role from an impacted VNF to a geo-redundant pair associated with the VNF. The method may further comprise initiating preparations for potential disruptions caused by the NFVI software modifications and switching over an active role of a VNF component (VNFC) instance hosted on an impacted VR. The method may further comprise initiating preparations for potential disruptions caused by the NFVI software modifications and redirecting at least a part of traffic to at least one redundant VNF component (VNFC) instance. The method may further comprise receiving readiness information from the VNF-level Manager and canceling the lead timer.

When the at least one VR is a VR group, applying software modifications may comprise multiple iterations until all NFVI resources supporting the VR group have been modified and, for an anti-affinity group, the VRs impacted simultaneously in the anti-affinity group do not exceed the maximum number specified for the anti-affinity group and at least a minimum number of VRs are kept available at all times. Notifying the VNF level manager about the completion of the software modifications may further comprise reversing configuration changes made in preparation to an impact. Notifying the VNF level manager about the completion of the software modifications may further comprise workload rebalancing. The method may further comprise sending a notification to the VNF level manager that the NFVI software modifications have been completed for the VNF hosted on the at least one VR.

The method may further comprise requesting that a compute host resource be put in maintenance mode, and indicating that some preparations need to be done so that the compute host resource can be taken out of service. The method may further comprise shutting down an impacted VM. The method may further comprise migrating an impacted VM to an available compatible host. The method may further comprise receiving a notification that the compute host resource does not serve any VM anymore and is in maintenance mode. The method may further comprise initiating an upgrade of the compute host resource. The method may further comprise receiving an information about completion of the resource upgrade. The method may further comprise requesting to take the compute host resource back into service. The method may further comprise performing actions to bring the compute host resource back into service. The method may further comprise receiving a request confirmation that the compute host resource is back in service again. There is provided a Network Function Virtualization Infrastructure (NFVI) software modification manager node comprising processing circuitry and a memory. The memory contain instructions executable by the processor whereby the NFVI software modification manager is operative to receive an NFVI software modifications request; send a notification that a software modification procedure of at least one Virtual Resource (VR) is about to start to a Virtual Network Function (VNF) level manager, the VNF level manager managing a VNF hosted on the at least one VR provided by the NFVI; apply software modifications to at least one resource of the at least one VR; and notify the VNF level manager about completion of the software modifications.

The NFVI software modification manager may be further operative to execute the method described above, or any step thereof.

There is provided a computer-readable storage medium, having stored thereon a computer program that when executed enables an NFVI software modification manager to execute the method described above, or any step thereof.

There is provided a cloud-based system, comprising processing circuitry and a memory. The memory contains instructions executable by the processor whereby a Network Function Virtualization Infrastructure (NFVI) software modification manager is enabled and is operative to receive an NFVI software modifications request; send a notification that a software modification procedure of the at least one Virtual Resource (VR) is about to start to a Virtual Network Function (VNF) level manager, the VNF level manager managing a Virtual Network Function hosted on the at least one VR hosted on the NFVI; apply software modifications to at least one resource of the at least one VR; and notify the VNF level manager about completion of the software modifications.

The cloud-based system may be further operative to execute the method described above, or any step thereof.

DETAILED DESCRIPTION

Figure 1:
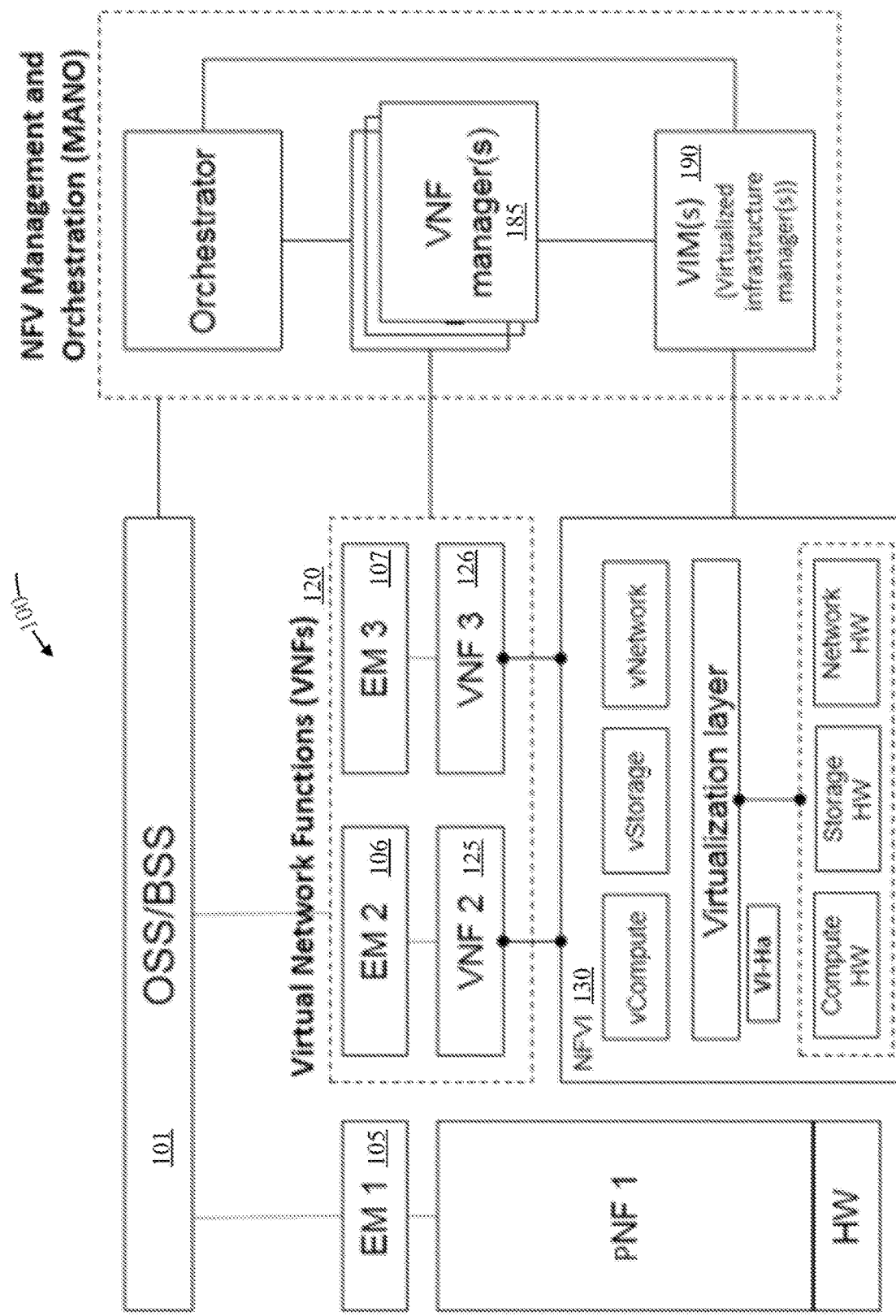
FIG. 1 is a schematic illustration of the NFV architecture that shows the decoupling of the NFV infrastructure (NFVI) and the VNF levels according to an embodiment.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Affinity and anti-affinity groups are used in the context of cloud-based systems such as the NFV infrastructure (NFVI) to indicate the restrictions on the placement of virtual resources imposed by the way these resources are used at the application/VNF level. For example, virtual machines (VMs), which host redundant entities of an application/VNF are grouped into an anti-affinity group requesting that, at the infrastructure level, these VMs are not placed on the same compute resource (i.e. physical host) so they are not affected simultaneously in case of a host failure. As a result, this grouping is known at the infrastructure level as well as at the application/VNF level.

When the infrastructure is upgraded, its hardware or virtualization resources are taken out of service, which impacts the virtual resources hosted on these resources. To speed up the upgrade, it is desirable to upgrade as many infrastructure resources in parallel as possible, however this has the potential to create outages at the application/VNF level services. Moreover, it is desired that applications/VNFs providing continuous and highly available services be prepared to infrastructure level outages and get notifications. This preparedness may range from simply blocking or switching out traffic from a single impacted VM to reconfiguring or scaling out the application/VNF for the time/duration of the infrastructure upgrade.

Since it is known to both the infrastructure and the application/VNF level, the anti-affinity group concept can be use as follows during infrastructure upgrades to address these opposing goals.

The infrastructure manager may or may not know the application/VNF level managers that can be associated with an anti-affinity group. It can know it, for example, by knowing the VNF Manager (VNFM) which requested a VM (for a VNF) and its placement in such a group. Alternatively, the infrastructure manager may expose a registration interface through which manager entities (e.g. the VNF manager(s) 185 of FIG. 1, and possibly the element manager (EM) such as the EM2 106 and EM3 107 of FIG. 1, etc.) can register for notifications about events (e.g. upcoming upgrade) impacting certain anti-affinity groups. The manager entities may indicate the anti-affinity groups/virtual resources for which they wish to receive notifications, and for each group/resource the type of events (e.g. beginning/end of upgrade) they are interested in as well as the lead time (e.g. time needed to prepare the application/VNF for the event) they need for the event type notification. When an infrastructure upgrade is initiated for a list of resources, the infrastructure manager organizes the upgrade of resources according to the hosted anti-affinity groups, i.e. resources hosting virtual resources of the same anti-affinity group are upgraded in sequence forming a series of steps, where in each step a single resource is upgraded. Resources hosting different anti-affinity groups can be upgraded in parallel thus they can be upgraded in the same step.

Based on a calculated ordering, the infrastructure manager identifies the managers responsible for applications/VNFs hosted on each anti-affinity group.

It sends a start notification to each manager interested in an anti-affinity group to be upgraded in the next series. This notification allows the application/VNF manager to make the preparations necessary to mitigate the impacts of the infrastructure upgrade, for example, it may scale out the application/VNF so that there is more redundancy, or in case of geographical redundancy, it may switch the active role to the not impacted site.

The infrastructure manager waits either until the appropriate lead time has expired or until it receives a ready response from each manager it has notified, then proceeds with the upgrade of resources supporting the anti-affinity group, one resource at a time.

Once the last resource supporting the hosted anti-affinity group has been upgraded, the infrastructure manager sends a completion notification to the managers to which the start notification was sent, which in turn can perform any action needed to wrap-up the upgrade preparedness at the application/VNF level, e.g. scale in.

The infrastructure manager may also send upgrade notification for each step individually within the upgrade series to the virtualized resources impacted in each particular step.

Figure 2:
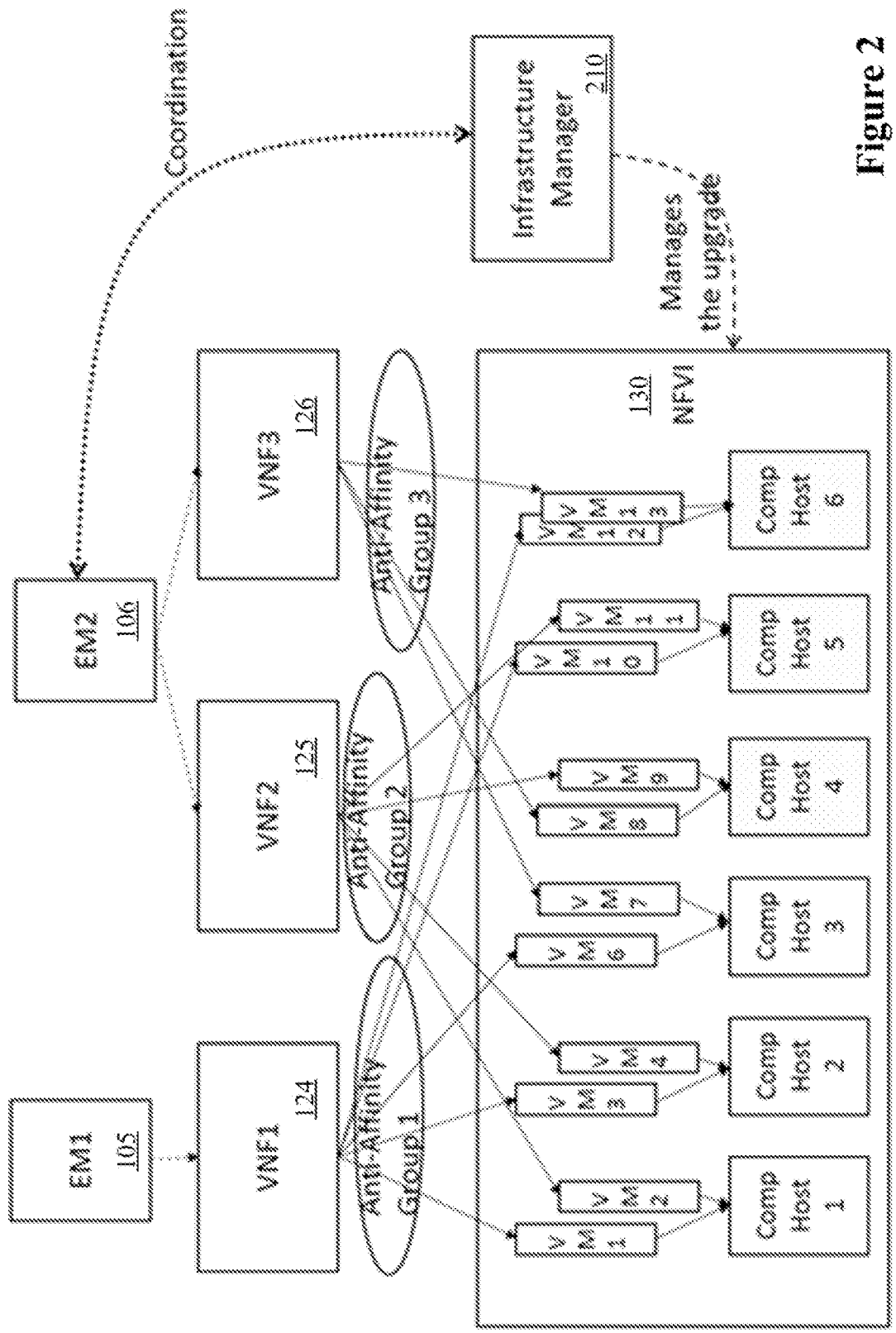
FIG. 2 is a schematic illustration of an example embodiment suitable for implementing a method for coordinating the upgrade of resources.

FIG. 2 illustrates an example embodiment in which principles taught herein are used to coordinate the upgrade of resources, between the infrastructure manager executing the upgrade and a manager (EM1 105 or EM2 106) managing an application/VNF (VNF1 124, VNF2 125 or VNF3 126) hosted on a group of virtual resources (VM1-VM13) hosted on the resources (Comp Host 1-Comp Host 6) to be upgraded. This coordination of the upgrade resources may be executed through direct communication between the VIM and EMs (such as indicated on FIG. 2) or through indirect communication of the VIM and EMs through the VNFMs (such as indicated on FIG. 1). In the specific example illustrated by FIG. 2, there are three VNFs (VNF1 124-VNF3 126) managed by two EMs (EM1 105 and EM2 106) which are hosted on an NFV Infrastructure (NFVI) 130 managed by the Infrastructure Manager.

It should be understood that the managers (EMs) 105, 106 are managing the application/VNF 124-126 which run on and/or are using the group of hardware resources. The application/VNF uses a group of virtual resources (the VMs) which are hosted on a group of (physical) resources (the CompHosts). This last group is the one being upgraded by the infrastructure manager, while the managers (EMs) are managing the top part of FIG. 2 (the VNFs).

Referring back to FIG. 1, more generally, the manager can be any one of EM2 106, EM3 107, a VNF manager 185 or even the operations support system/business support system (OSS/BSS 101). The notification can be sent by the virtualized infrastructure manager(s) (VIM(s)) 190 and the entities to be upgraded can be anything in the NFVI 130 box, namely the vCompute, the virtualization layer, the interface between the virtualization layer (VI) and the hardware (HA) or any of the compute, storage and network hardware.

Returning to FIG. 2, VNF2 125 runs on multiple VMs {VM2, VM4, VM9, VM 11}, which are listed in Anti-Affinity Group 2. VNF3 126 also runs on multiple VMs {VM7, VM8, VM13}, which are listed in Anti-Affinity Group 3.

Figure 3:
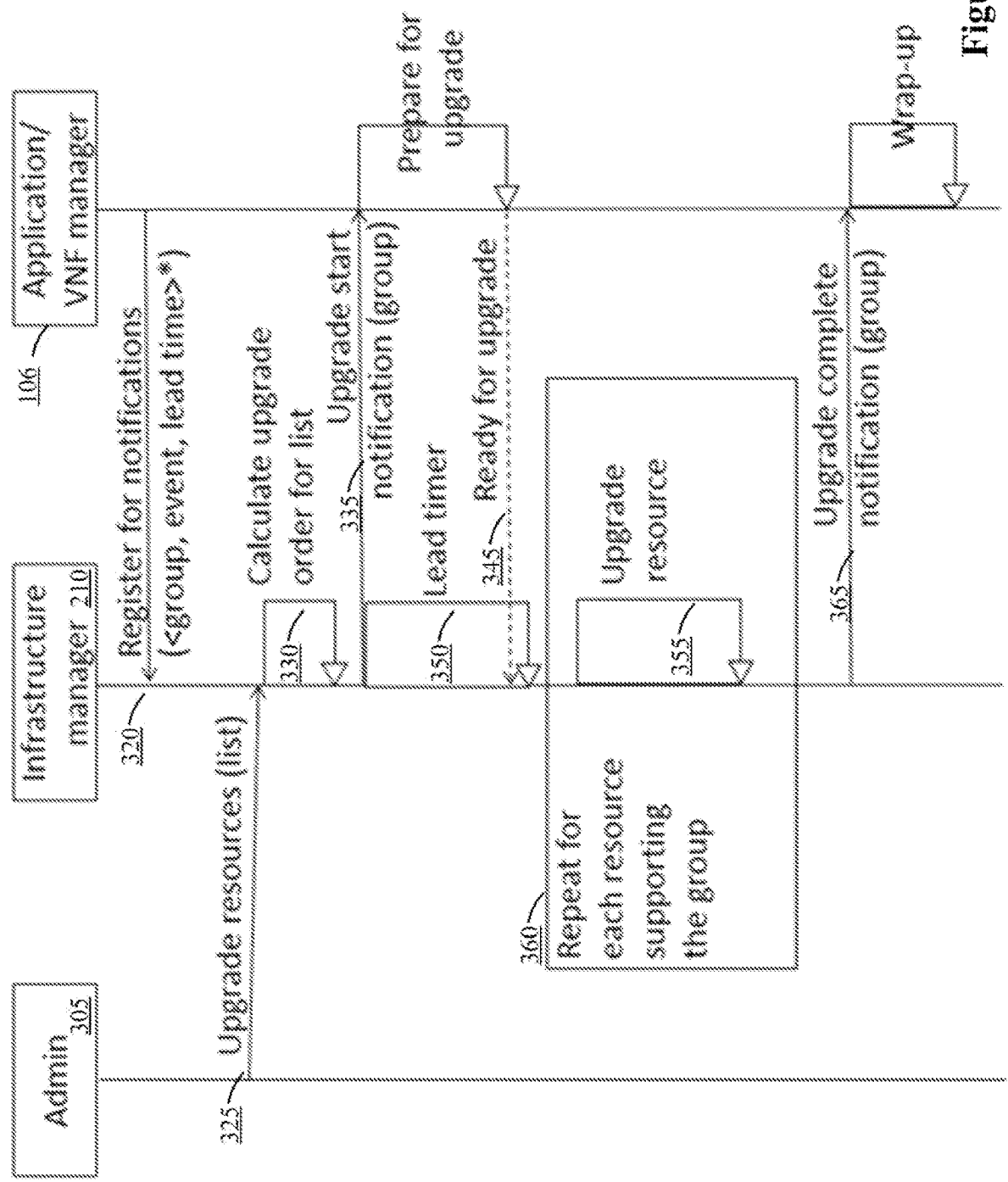
FIG. 3 is a flow diagram illustrating an example exchange of messages for the coordination of an infrastructure upgrade according to an embodiment.
Figure 4:
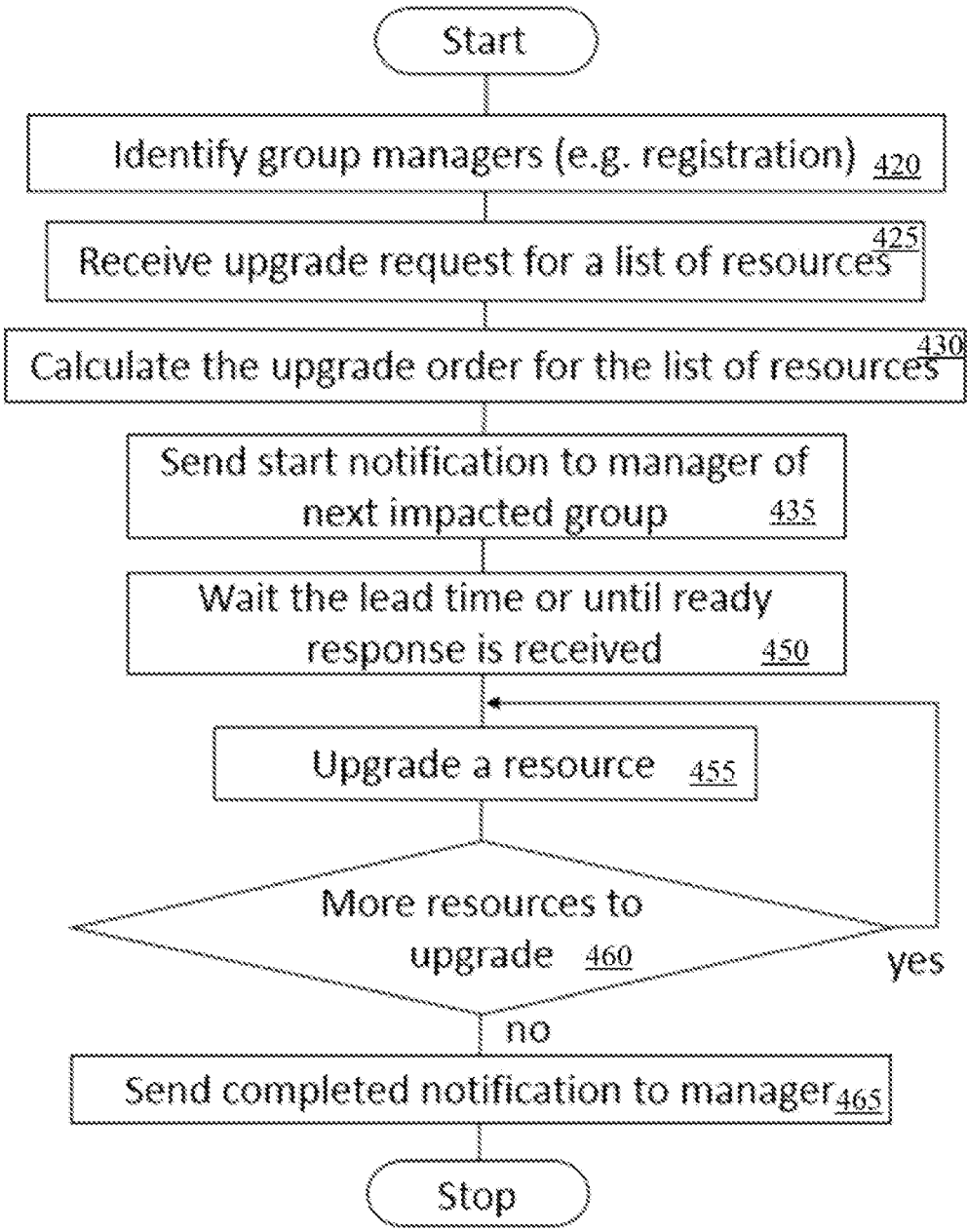
FIG. 4 is a flowchart illustrating the steps for coordinating an infrastructure upgrade according to an embodiment.

According to the method illustrated in FIGS. 3 and 4, EM2 106 registers with the Infrastructure Manager 210 for upgrade notifications for Anti-Affinity Group 2 (for VNF2 125) and for Anti-Affinity Group 3 (for VNF3 126), steps 320, 420. This registration can happen only once, although it is possible that it could happen several times. The registration can happen at any time in advance of the upgrade; possibly a long time in advance of the upgrade. The VMs (which are virtual resources) are hosted on the compute hosts (which are physical resources), as shown. It should be noted that the infrastructure manager 210 may correspond to a VIM 190 extended with a software modification manager (SMM) 705, illustrated in FIG. 7.

In the example of FIGS. 2-4, a system administrator 305 wants to upgrade the hypervisor which runs on compute hosts {CompHost4, CompHost5, CompHost6}, steps 325, 425. These physical hosts host VMs for both Anti-Affinity Group 2 and Anti-Affinity Group 3. The Infrastructure Manager 210 decides in which order the hosts are going to be upgraded, steps 330, 430. This corresponds to the step of calculating the upgrade order for the list of resources. Since the physical hosts host anti-affinity groups, the Infrastructure manager 210 needs to do the upgrade host by host with respect to those anti-affinity groups. If the Infrastructure manager decides to start the upgrade with CompHost6, it sends the notification to EM2 106 for Anti-Affinity Group 3, steps 335, 435 and waits for the response or the expiration of a timer, steps 345, 350, 450. For Anti-Affinity Group 2 the infrastructure manager sends the notification to EM2 106 before it proceeds with the upgrade, steps 355, 455, of the first of either CompHost4 or CompHost5. The upgrade is then repeated for each resource, steps 360, 460.

If the infrastructure manager had decided to start with the upgrade with CompHost4, instead of CompHost6, as described above, then it would have sent a notification for both anti-affinity group 2 and anti-affinity group 3, to EM2 which manages VNF2 125 and VNF3 126, before starting any upgrade.

In a general case, any subset of hosts can be selected as first ones to upgrade as long as they do not host two VMs from the same anti-affinity group. I.e. in case of the example of FIG. 2, there is no two physical hosts to be upgraded that would not impact two VMs of one or the other anti-affinity group. Hence the upgrade needs to proceed one host at a time, and any one physical host can be selected as the first host to upgrade. The selection of the actual order in which the hosts will be upgraded in such a case may be done in any manner known by a person skilled in the art.

The end notification is sent to the corresponding EM, once hosts for all VMs of a given anti-affinity group have been upgraded, i.e. for Anti-Affinity Group 2 after both CompHost4 and CompHost5 have been upgraded and for Anti-Affinity Group 3 after both CompHost4 and CompHost6 have been upgraded, step 365, 465.

In the example of FIG. 2, since EM1 105 did not request notifications for Anti-Affinity Group 1, it is not aware of the upgrade of CompHost 5 and CompHost6 and VNF1 will perceive the upgrade as failure of CompHost5 and CompHost6.

In an embodiment, there is provided a method, executed in a Network Function Virtualization Infrastructure (NFVI) software modification manager, for upgrading infrastructure resources hosting a plurality of Virtual Resources (VRs), comprising:
 receiving an upgrade request for a list of infrastructure resources;
 determining an upgrade sequence for the list of infrastructure resources;
 sending a notification that a software modification procedure is about to start to a Virtual Network Function (VNF) level manager managing a Virtual Network Function hosted on a VR hosted on an infrastructure resource selected for upgrade;
 upgrading the infrastructure resources selected for upgrade; and
 notifying the VNF level manager about the completion of the process.

The infrastructure resources may be hardware resources, the upgrade request for the list of infrastructure resources may be received from a system administrator or from a network node and the list of infrastructure resources may comprise one or more resources. Determining an upgrade sequence may comprise identifying impacted VRs and VR groups and determining an order in which the software modifications of NFVI resources can be performed considering constraints imposed by the impacted VRs and VR group. In the method, a first infrastructure resource may be selected based on groupings of the VRs in anti-affinity groups related to VNFs, for an anti-affinity group, the VRs impacted simultaneously in the group may not exceed a maximum number specified for the anti-affinity group and at least a minimum number of VRs may be kept available at all times. The notification that a software modification procedure is about to start may comprise information for a single VR or information for a VR group, the notification that a software modification procedure is about to start may further specify whether a VR is going to be live-migrated or shut down, and a leadtime. The leadtime may correspond to a maximum time to wait before starting the upgrading of the infrastructure resource. The NFVI software modification manager may wait for the leadtime before starting the upgrading of the infrastructure resource and the leadtime may be determined as the maximum leadtime imposed by constraints. The notification may be based on subscription and/or sent via the MANO entity requesting the allocation of the virtualized resource or creating the anti-affinity group. After sending the start notification that a software modification procedure is about to start, the method may further comprise receiving a ready for software modification message from the VNF level manager and upgrading the infrastructure resource may comprise upgrading a software component of the infrastructure resource.

In the method, upgrading the infrastructure resource may comprises any one of:
 changing a firmware of the infrastructure resources;
 change a host OS and/or a hypervisor software, including virtual machines;
 changing software providing virtual networks; and
 changing software providing virtual storage.

When the upgrading of the infrastructure resource selected for upgrade is completed, a further infrastructure resource may be selected for upgrade and may be upgraded, until all the infrastructure resources in the list of infrastructure resources are upgraded. The method may further comprise, as an initial step, the step of receiving, from a VNF-level Manager, information whether coordination of NFVI software modifications is necessary for a VR or a VR group, as well as the applicable constraints. Coordination of NFVI software modifications may entail that the VNF-level Manager is registering to receive notifications from the NFVI software modification manager. A VR group may be an anti-affinity group.

The VNF-level Manager may register to receive notification for a plurality of anti-affinity groups. The step of receiving information from a VNF-level Manager may further comprise receiving any one of:
 a minimum lead time of the notification, the lead time reflecting the time the VNF needs to prepare for the potential disruption(s);
 a minimum number of anti-affinity group members required to be available and/or a maximum number of anti-affinity group members that can be impacted simultaneously; the minimum number reflecting a minimum number of virtualized resources required for the function/service to be provided (e.g. cluster membership requires quorum); the maximum number reflecting the replication schema/redundancy; and a VM migration tolerance, wherein a VM may tolerate live, offline or no migration at all.

The method may further comprise the step of sending a notification that the upgrade request for the list of infrastructure resources has been completed. VR may comprise any one of virtual machines, containers, hypervisors, virtual local area network and virtual disks/storage. The NFVI software modification manager may be a virtual infrastructure manager (VIM), the NFVI software modification manager may be composed of a plurality of VIMs, and the VNF level manager may comprise any one of a VNF Manager, an Element Manager (EM), an operations support system/business support system (OSS/BSS) or another functional block responsible for the coordination on behalf of hosted VNF(s) and Management and Orchestration (MANO).

In an embodiment, there is provided an NFVI software modification manager comprising processing circuitry and a memory, the memory containing instructions executable by the processor whereby the NFVI software modification manager is operative to execute any of the methods described herein.

In an embodiment, there is provided a computer-readable storage medium, having stored thereon a computer program that when executed enables an NFVI software modification manager to execute any of the methods described herein.

In an embodiment, there is provided a method for coordinating the upgrade of resources, between an infrastructure manager executing the upgrade and a manager managing an application/VNF hosted on a group of virtual resources hosted on the resources to be upgraded, comprising:

receiving an upgrade request for a list of resources;

computing an upgrade order for the list of resources according to constraints of the hosted groups of virtual resources;

sending a start notification to a manager interested in a group of resources to be upgraded;

upgrading the resources of the group of resources; and sending a completed notification to the manager interested in the group of resources to be upgraded.

The method may further comprise receiving a request for registering for notifications for a group of virtual resources from the manager of an application/VNF using that group of virtual resources when the group of virtual resources or their hosting group of resources to be upgraded.

The method, may further comprise before upgrading the resources of the group of resources, sending a notification to one or more managers registered for a group of virtual resources hosted on the group of resources; and waiting until an acknowledgement is received from the manager interested in the group of resources to be upgraded, the acknowledgement being in response to the start notification.

The content of section 6.3.3 of REL006 of ETSI NFVI software modification scenarios and requirements, entitled NFVI Software, as well as the accompanying Annex B: NFVI software modification flows, are reproduced throughout the remainder of the description below and in FIGS. 5 and 7. These extracts include changes that were proposed for introduction in the ETSI standard, according to an embodiment.

6.3.3 NFVI Software

6.3.3.1 Introduction

The NFVI functional block is the totality of all hardware and software components which build up the environment in which VNFs are deployed, managed and executed. It can be divided into physical hardware resources for computing, storage and networking, and software resources providing the virtualisation layer and the virtualised resources (e.g. hypervisors, VMs, VLANs, virtual disks etc.).

The NFVI and its constituent components have a lifecycle independent of the lifecycles of the VNFs and MANO hosted on that infrastructure. The layered nature of software, however, means that changes to the NFVI layer has the potential to have adverse effects on the VNF and MANO layers if care is not taken (as described in this clause) to avoid or minimise this impact. This potential impact affects the governance, precedence and priority over software modification management activities.

A NFVI software modification procedure may be initiated after the successful completion of the initial software download procedure as described in clause 6.2 (not provided herein).

6.3.3.2 Software Modification Precedence

The nature of layered architectures is that, through planning and technology, many software modifications of a given layer can proceed without impact on surrounding layers. This, however, is not universal, and there will be edge cases where a conflict arises between the need to make software modifications to the NFVI layer, and its potential to impact one or more workloads (VNF and/or MANO) hosted on that NFVI. In these cases, rules must be defined for how to handle the conflict.

Since the purpose of NFVI is to support workloads it might seem essential to let those workloads dictate when a software modification to the NFVI can proceed. However, this approach, if unbounded, could indefinitely block NFVI software modifications from proceeding, with potentially significant impacts on stability, security, or new service deployment.

Conversely, limits in technology and impacts on services either through direct service disruption during a software modification, or indirect service disruption through pre-modification workload migration, may be deemed unacceptable for certain classes of workload.

The balance between these extremes is to provide a limited facility for services to respond to a pending service disruption/outage at the NFVI layer, and take appropriate actions in a more graceful fashion than the actions that would be taken under failure conditions. This would generally take the form of a "notice period" of pending software modifications, and the time bound opportunity for services to respond on their own in preparation for such a NFVI software modification. This allows for more customised, fine-grained responses to predictable NFVI service disruptions.

It should be noted that no amount of testing can guarantee the success of a NFVI software modification. Thus, any notice period can serve only to reduce the potential for disruptive impact. A software modification might introduce a pathological behaviour, and so part of the software modification management process must be the gradual, risk controlled introduction of workloads onto the newly changed infrastructure, in order to further reduce the risk associated with software modifications.

6.3.3.3 Coordination of NFVI Software Modifications

A software modification will often affect far more than a single NFVI component, and might require the controlled deployment of software modifications across an entire resource pool on the one hand side. On the other hand, VNFs and MANO deployed on these NFVI components may need to take different actions to mitigate the potential impact. Some may need to change their configuration e.g. scale out to increase their redundancy, others may need to evacuate the virtualised resource being shut down for the time of the software modification, or block/reduce traffic directed to such an impacted virtualised resource.

Thus, the prerequisite of successful coordination is to be able to identify at the NFVI layer the constraints of the hosted VNFs and MANO with respect to the virtualised resources and their groups.

The grouping of virtualised resources relevant and known to both the NFVI and the VNF/MANO layers are the anti-affinity group. It is used typically to prevent single points of failure and therefore reflect redundancy used at the upper layers.

The constraints may be expressed when the virtualised resources and their groups are requested from or defined for the NFVI layer, for example, together with the manager entity who would need to be notified about the upcoming NFVI software modification. Alternatively, the manager entities could subscribe for such notifications.

The constraints among others might indicate whether the notification is requested before a virtualised resource or a group of virtualised resources (e.g. anti-affinity group) being impacted, the lead time requested for the notification as preparations may need time, and options such as an upper time limit at which virtual resource migration is feasible otherwise shutdown is preferred, or for an anti-affinity group the minimum number of virtual resources that need to be available or maximum number virtual resources that can be impacted simultaneously.

Whenever a NFVI software modification is requested from the NFVI Software Modification Manager it needs to coordinate the software modification activities at the NFVI layer with the managers of the hosted entities by considering these constraints of virtualised resources and groups. the NFVI Software Modification Manager is responsible for managing the NFVI software modification procedure. Note however that at this time it has not been decided which NFV functional block will implement this function.

Figure 5:
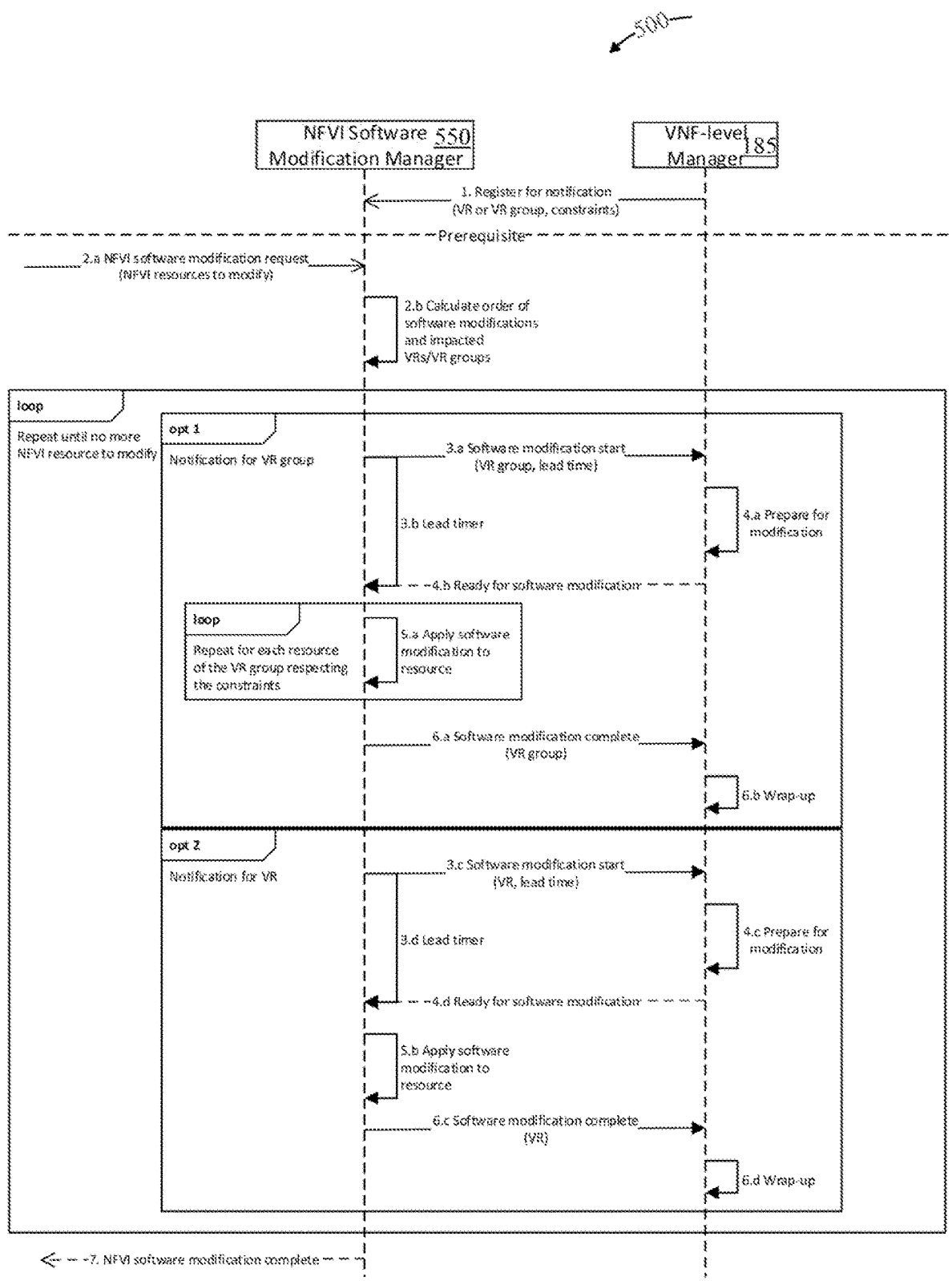
FIG. 5 is a flow diagram illustrating the coordination flow for NFVI software modification according to an embodiment.

The general coordination flow for NFVI software modification could look like the example illustrated in FIG. 5. The diagram shows the NFVI Software Modification Manager 705 function 550 and a VNF-level Manager entity 185, which could represent, for example, the VNFM, the EM, the OSS/BSS or possibly another functional block responsible for the coordination on behalf of the hosted VNF(s) and MANO.

According to FIG. 5 the exemplary flow 500 is as follows:
1. As prerequisite, the VNF-level Managers inform the NFVI Software Modification Manager 705 whether coordination of NFVI software modifications is necessary for a virtualised resource (VR) or a VR group (such as an anti-affinity group) as well as the applicable constraints. This may be subscription based or part of the VR/VR group creation process
2. When a NFVI software modification is requested (2.a), the NFVI Software Modification Manager 705 identifies the impacted VRs and VR groups and the order in which the software modifications of NFVI resources can be performed considering the constraints imposed by these impacted VRs and VR group (2.b).
3. The NFVI Software Modification Manager notifies the VNF-level Manager that an NFVI software modification procedure is about to start, which may impact the VR group (3.a) or the VR (3.c) for which it coordinates the process. For a VR such as a virtual machine it may further specify whether the VR is going to be live-migrated or shut down. At the same time as the notification is sent, the NFVI Software Modification Manager starts a timer with the determined lead time. The lead time may be determined, for example, as the maximum lead time imposed by the constraints. The NFVI Software Modification Manager wait the lead time before proceeding with the software modifications.
4. The VNF-level Manager initiates the necessary preparations for the potential disruption(s) caused by the NFVI software modification(s). In case of a VR group (4.a) this may mean for example a scale out to increase the VNF's redundancy, or switching the active role from the impacted VNF to its geo-redundant pair. In case of a VR (4.c) this may also mean a switch over of the active role of the VNFC instance hosted on the impacted VR, or redirecting part or the entire traffic to another redundant VNFC instances. Once the preparations are completed the VNF-level Manager may inform the NFVI Software Modification Manager about its readiness (4.b, 4.d), however this is not necessary. Such response can be used by the NFVI Software Modification Manager to cancel the lead timer.
5. Once the lead time expires or all responses have been received the NFVI Software Modification Manager proceeds with the software modification of the NFVI resources (5.a) or resource (5.b) as applicable. In case of a VR group (5.a), this may mean multiple iterations until all NFVI resources supporting the VR groups have been modified as requested. Doing so the NFVI Software Modification Manager needs to respect the applicable constraints. For an anti-affinity group, for example, the VRs impacted simultaneously in the group may not exceed the maximum number specified for the anti-affinity group and at least the minimum number of VRs may need to be kept available at all times.
6. Once the NFVI software modification procedure is completed for all required resources, the NFVI Software Modification Manager notifies the VNF-level Manager about the completion of the process (6.a, 6.c), which in turn can initiate any wrap-up actions (6.b, 6.d), such as reversing the configuration changes made in preparation to the impact or workload rebalancing.
7. Finally, the NFVI Software Modification Manager sends a notification that the requested NFVI software modification has been completed.

Figure 6:
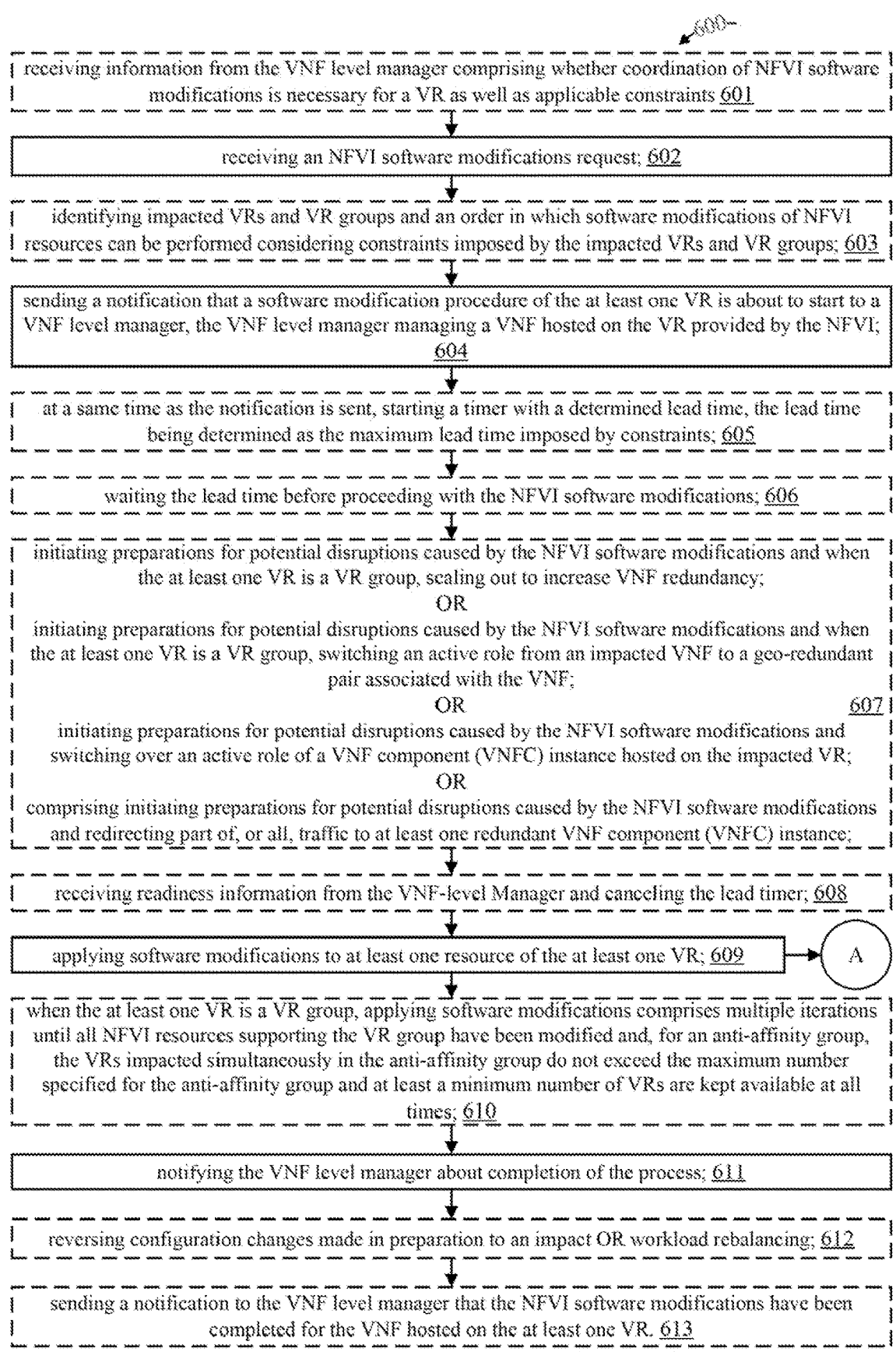
FIG. 6 is a flowchart of a method for coordination of NFVI software modifications according to an embodiment.

Turning to FIG. 6, there is provided a method 600, executed by a Network Function Virtualization Infrastructure (NFVI) software modification manager 550, for coordination of NFVI software modifications of a NFVI providing at least one Virtual Resource (VR) hosting at least one Virtual Network Function (VNF), comprising:
receiving an NFVI software modifications request, step 602;
sending a notification that a software modification procedure of the at least one
VR is about to start to a VNF level manager, the VNF level manager managing a VNF hosted on the at least one VR provided by the NFVI, step 604;
applying software modifications to at least one resource of the at least one VR, step 609; and
notifying the VNF level manager about completion of the software modifications, step 611.

The at least one VR may comprise at least one VR group. The method may further comprise, receiving information from the VNF level manager comprising an indication whether coordination of NFVI software modifications is necessary for a VR as well as applicable constraints, step 601. The information may further comprise an anti-affinity group. The receiving information may be subscription based or part of the VR creation process. The method may further comprise identifying impacted VRs and VR groups and an order in which software modifications of NFVI resources can be performed considering constraints imposed by the impacted VRs and VR groups, step 603. The notification to the VNF level manager may further comprise an indication whether the at least one VR is going to be live-migrated or shut down when the at least one VR is as a virtual machine. At a same time as the notification is sent, a timer may be started with a determined lead time, the lead time being determined as the maximum lead time imposed by constraints, step 605. The method may further comprise waiting the lead time before proceeding with the NFVI software modifications, step 606. When readiness signaling can be used by the VNF-level manager (i.e. the API is provided) the waiting is at most the lead time. When this option is not provided the waiting is at least the lead time.

The method may further comprise initiating preparations for potential disruptions caused by the NFVI software modifications and, when the at least one VR is a VR group, scaling out to increase VNF redundancy. Or, the method may further comprise initiating preparations for potential disruptions caused by the NFVI software modifications and, when the at least one VR is a VR group, switching an active role from an impacted VNF to a geo-redundant pair associated with the VNF. Or, the method may further comprise initiating preparations for potential disruptions caused by the NFVI software modifications and switching over an active role of a VNF component (VNFC) instance hosted on an impacted VR. Or the method may further comprise initiating preparations for potential disruptions caused by the NFVI software modifications and redirecting at least a part of traffic to at least one redundant VNF component (VNFC) instance, step 607.

The method may further comprise receiving readiness information from the VNF-level Manager and canceling the lead timer, step 608. When the at least one VR is a VR group, applying software modifications may comprise multiple iterations until all NFVI resources supporting the VR group have been modified and, for an anti-affinity group, the VRs impacted simultaneously in the anti-affinity group do not exceed the maximum number specified for the anti-affinity group and at least a minimum number of VRs are kept available at all times, step 610. Notifying the VNF level manager about the completion of the software modifications may further comprise reversing configuration changes made in preparation to an impact, or workload rebalancing, step 612. The method may further comprise sending a notification to the VNF level manager that the NFVI software modifications have been completed for the VNF hosted on the at least one VR, step 613.

6.3.3.4 NFVI Resource Software Modification

A software modification of NFVI may include:
Change of firmware of the physical equipment
Change of the host OS and/or hypervisor software, including virtual machines
Change of software providing virtual networks
Change of software providing virtual storage Note that similar consideration may apply to the replacement of physical computing, networking and storage equipment.

Figure 7:
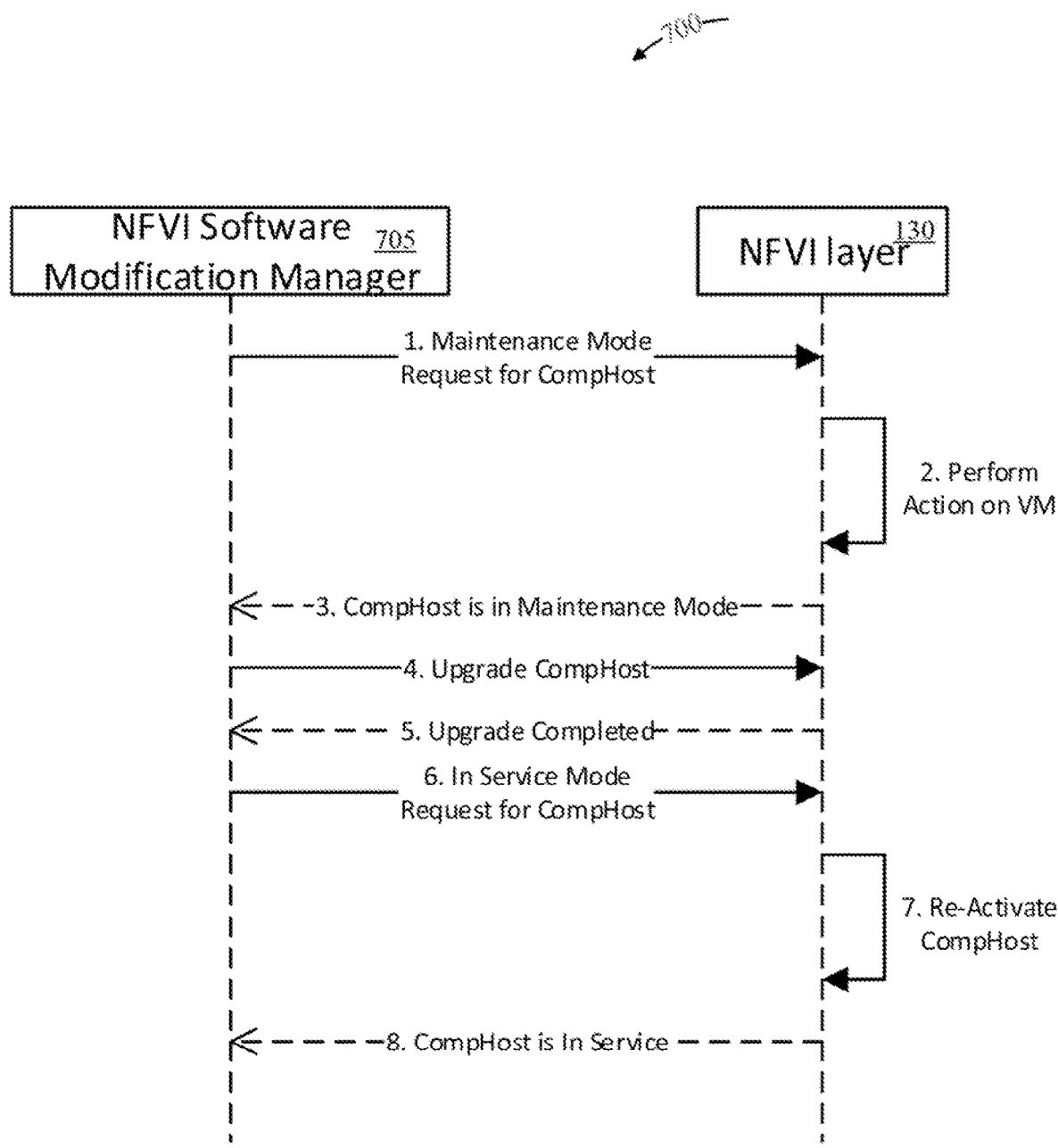
FIG. 7 is a flow diagram illustrating an example exchange of messages for handling NFVI resource software modification according to an embodiment.

The sequence diagram of FIG. 7 provides an overview of how these NFVI resource software modifications could be handled. It is the elaboration of the fifth step of the exemplary coordination flow using as example the upgrade of a compute host (CompHost), which impacts a hosted VR, namely a VM. Note that this is an illustrative example demonstrating the interaction that could take place for this process.

1. NFVI Software Modification Manager requests that a compute host (e.g. CompHost) is put in maintenance mode. This means that some preparations need to be done so that the resource can be taken out of service.
2. Depending on the applicable policies, an appropriate action is performed on the impacted VM: The VM may be shut down or it might be migrated. Migration requires that a compatible host is available to migrate the VM to.
3. Once the action is completed and the resource does not serve any VM anymore, it is in maintenance mode and the NFVI Software Modification Manager is informed.
4. The NFVI Software Modification Manager initiates the upgrade of the CompHost resource. The upgrade method is not essential as the resource is out of service. The duration of the upgrade method might be of importance as will be discussed below.
5. The NFVI Software Modification Manager is informed about the completion of the resource upgrade.
6. Since the upgrade has finished the NFVI Software Modification Manager requests to take the CompHost resource back into service.
7. The actions necessary to bring the resource back into service are performed.
8. NFVI Software Modification Manager request is confirmed that the CompHost resource is back in service again.

The flow diagram 700 of FIG. 7 focuses on the upgrade of an individual resource and the same process needs to be repeated for each NFVI resource or group of resources to be upgraded as it has been indicated in the step 5 of the exemplary coordination flow of FIG. 5. Some of these may be performed in parallel, while other may need to be in sequence.

In general, the software modification of individual resources need to be ordered in such a way that they do not impact the network services. In particular, VMs that participate in a redundancy schema at the VNF level are configured as an anti-affinity group, which needs to be taken into consideration. The software modification process of individual resources should impact at most an eligible number of VMs of an anti-affinity group at a time. The number could be constrained by the minimum number of virtualised resources that need to be available at any given time in the anti-affinity group (for example to maintain quorum) and/or the maximum number of virtualised resources that can be impacted simultaneously based on the replication schema used at the VNF or MANO level.

With respect to virtualised network resources, the anti-affinity grouping of virtualised links requires similar consideration although the NFVI may provide reliable virtualised network resources, whose reliability needs to be maintained throughout the upgrade. The same approach is applicable to virtualised storage resources.

For a large data center it is probably not sufficient to perform the software modification of resources one by one as this would take considerable time. Careful planning of the NFVI software modification will be needed to optimize the time consumption. The entity planning the software modification should e.g. consider which are the resources that could be put in maintenance mode simultaneously, where to migrate resources in order to avoid repeating migration steps and how to optimize resource relocation when the physical resources are limited.

Additional considerations may be required to accommodate potential NS and VNF LCM requests during the NFVI software modification as these operations may interfere with the software modifications and may be subject to SLAs. For example, VNF scaling in may remove just upgraded virtualised resources, while scaling out of the old version instead of the new prolongs the NFVI software modification process. Also, the software modification process may prevent scaling out or instantiation operations if too many resources are taken out from a resource pool for software modification at peak usage time, which in turn may cause performance degradation at the VNF and network service levels or prevent VNF healing after failure.

Figure 8:
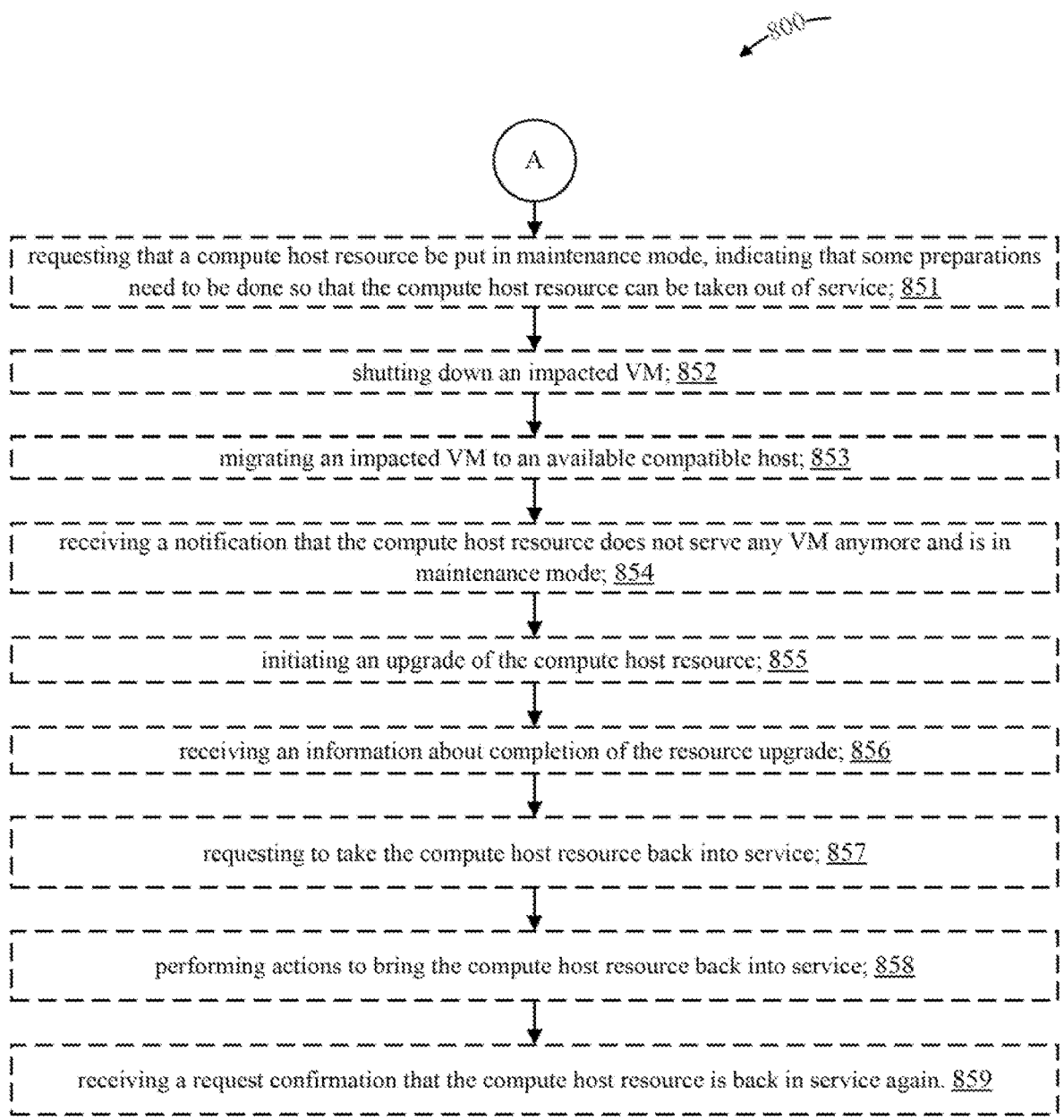
FIG. 8 is a flowchart of a method for NFVI resource software modification according to an embodiment.

Turning to FIG. 8, there is provided a method 800, for applying software modifications to at least one resource of the VR, comprising requesting that a compute host resource be put in maintenance mode, indicating that some preparations need to be done so that the compute host resource can be taken out of service, step 851. The method may further comprise shutting down an impacted VM, step 852. The method may further comprise migrating an impacted VM to an available compatible host, step 853. The method may further comprise receiving a notification that the compute host resource does not serve any VM anymore and is in maintenance mode, step 854. The method may further comprise initiating an upgrade of the compute host resource, step 855. The method may further comprise receiving an information about completion of the resource upgrade, step 856. The method may further comprise requesting to take the compute host resource back into service, step 857. The method may further comprise performed actions to bring the compute host resource back into service, step 858. The method may further comprise receiving a request confirmation that the compute host resource is back in service again, step 859.

6.3.3.5 NFVI Software Modification Requirements

REQ.NFVI.M.01: VNF instances or their managers (e.g. EM/OSS/BSS/VNFM) shall be able to receive an advanced notification about the software modification of a NFVI resource or group of NFVI resource as well as at the completion of the respective software modifications. For the purpose of the notification a group of NFVI resources impacting the VNF can be identified by the anti-affinity group they are supporting and the VNF is using or by a resource group assigned to a tenant.

NOTE: The notification may be based on subscription and/or sent via the MANO entity requesting the allocation of the virtualised resource or creating the anti-affinity group.

REQ.NFVI.M.02: It shall be possible to specify parameters of impact tolerance of a VNF with respect to each of their virtualised resource(s) and anti-affinity group(s).

Towards the NFVI layer

The minimum lead time of the advanced notification.

NOTE: The lead time reflects the time the VNF needs to prepare for the potential disruption(s).

The minimum number of anti-affinity group members required to be available and/or the maximum number of anti-affinity group members that can be impacted simultaneously.

NOTE: The minimum number reflects the minimum number of virtualised resources required for the function/service to be provided (e.g. cluster membership requires quorum); the maximum number reflects the replication schema/redundancy.

VM migration tolerance

NOTE: A VM may tolerate live, offline or no migration at all. Considering the VNF level fault detection mechanisms a maximum interruption time can be specified that can go unnoticed. If the NFVI cannot guarantee this maximum interruption time, live migration will be detected and handled as a failure at the VNF level therefore offline migration should be used instead. The migration may also be constrained by affinity/anti-affinity groups and/or location constraints.

Optionally towards the MANO

Rules/policies that prepare the VNF for an upcoming upgrade NOTE: Example of such rule would be a scale out rule that the VNFM or NFVO applies to the VNF when it receives the notification of an NFVI software modification for an anti-affinity group.

REQ.NFVI.M.03 During the NFVI software modification process the affinity/anti-affinity groups of virtualised resources shall be maintained according to the specified parameters. The NFVI software modification process shall not impact simultaneously more than the eligible number of virtualised resources of an anti-affinity group.

NOTE: The eligible number of resources depends on the currently available virtualised resources, the maximum number that can be taken out and the minimum number of members required in an anti-affinity group.

REQ.NFVI.M.04: The NFVI software modification process shall not impact the overall reliability and performance indicators (KPIs) of the virtualised resources offered. The NFVI software modification process shall consider potential NS and VNF LCM operations during its execution.

NOTE: When virtualised resources are requested during an NFVI software modification within the limits of existing reservations the requests should always succeed.

REQ.NFVI.M.05 During the NFVI software modification process the compatibility requirements between virtualised and virtualisation resources shall be satisfied.

Figure 9:
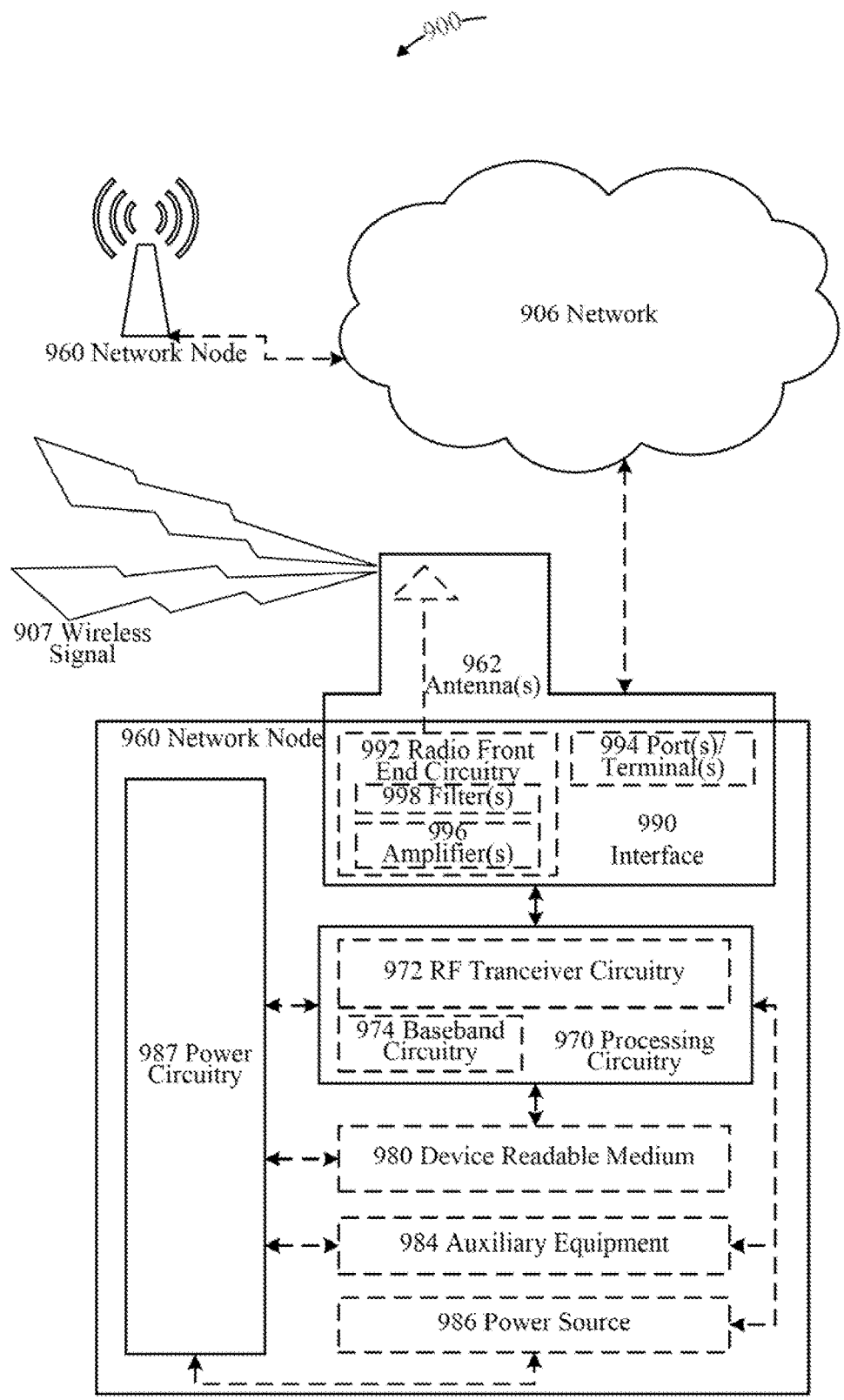
FIG. 9 is a schematic illustration of a network node according to an embodiment.

NOTE: For example, in case of the upgrade of the hypervisor or OS of virtualisation layer the virtualised resource using the current VM image may become incompatible. The NFVI software modification needs to incorporate the VM image conversion process and ensure that VMs are migrated/failed over between compatible hosts and that reservations are adjusted appropriately during the upgrade, which means that if both old and new versions are being used simultaneously both need to have access to reserved resources adequately. Turning to FIG. 9, illustrating a network node in its environment 900, the network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules). Similarly, network node 960 may be composed of multiple physically separate components, which may each have their own respective components. In certain scenarios in which network node 960 comprises multiple separate components, one or more of the separate components may be shared among several network nodes.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of the processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960 and network 906. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals 907. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

In some embodiments some or all the steps of the methods described herein may be executed in network node 960. For example, the network node may execute a Network Function Virtualization Infrastructure (NFVI) software modification manager or part of the functionality thereof, the network node comprising processing circuitry and a memory, the memory containing instructions executable by the processor whereby the NFVI software modification manager is operative to:

receive an NFVI software modifications request;
send a notification that a software modification procedure of at least one Virtual Resource (VR) is about to start to a Virtual Network Function (VNF) level manager, the VNF level manager managing a VNF hosted on the at least one VR provided by the NFVI;
apply software modifications to at least one resource of the at least one VR; and
notify the VNF level manager about completion of the software modifications.

The NFVI software modification manager executed in whole or in part on in network node 960 is further operative to execute any one of the methods disclosed herein. In some embodiments, a computer-readable storage medium, has stored thereon a computer program that when executed enables an NFVI software modification manager to execute any one of the methods disclosed herein.

Figure 10:
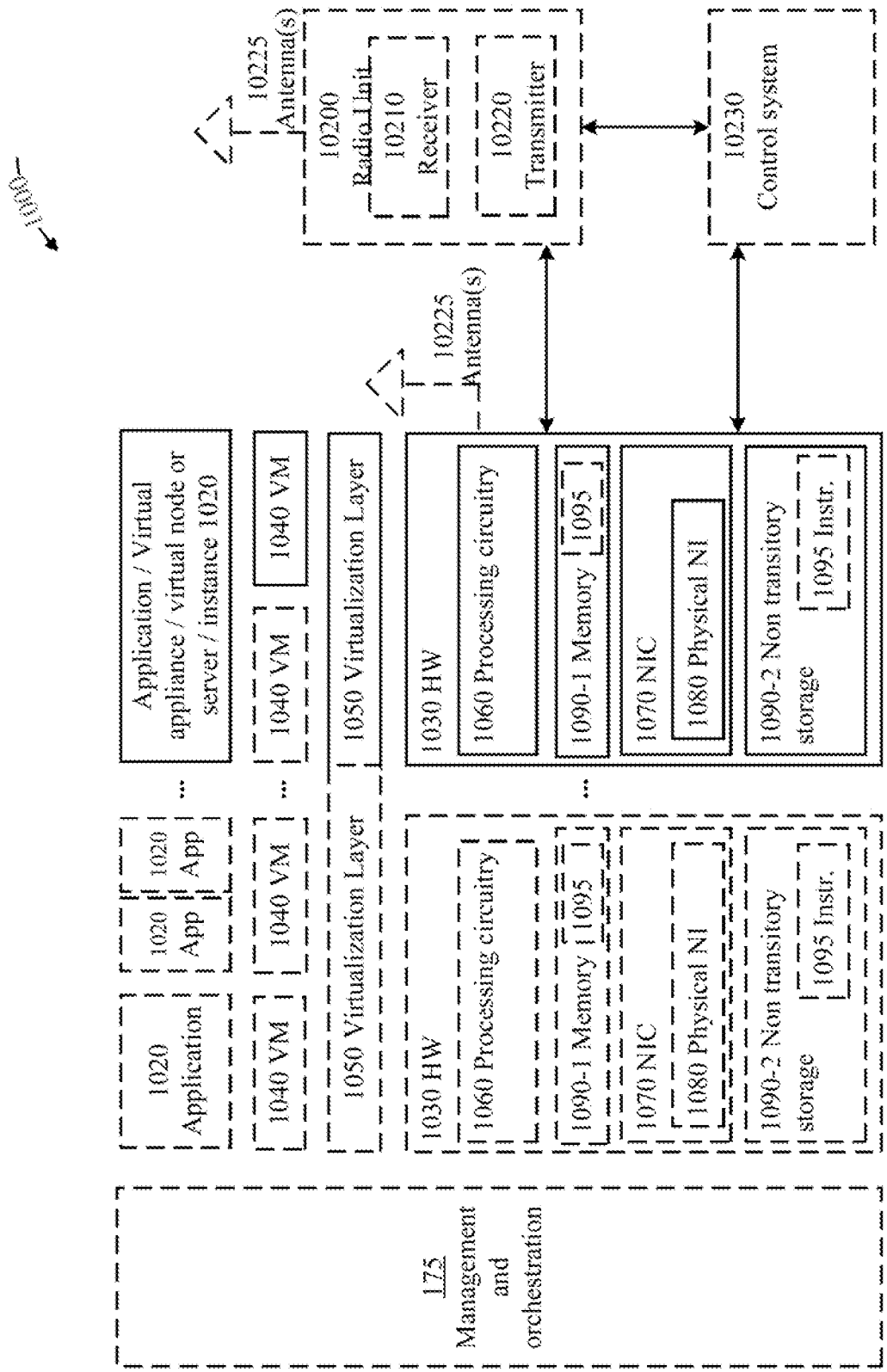
FIG. 10 is a schematic illustration of a virtualization environment according to an embodiment.

FIG. 10 is a schematic block diagram illustrating a virtualization environment 1000.

In the context of this disclosure, a container is a software component that can contain other components within itself. Multiple containers can share the same operating system (OS) instance, and each container provides an isolated execution environment for its contained component. As opposed to VMs, containers and their contained components share the same host OS instance and therefore create less overhead.

There are two types of placement constraints in a cloud environment: affinity groups and anti-affinity groups. The anti-affinity groups express which VMs cannot be placed together on the same host. Thus, considering the application level redundancy, VMs of the same anti-affinity group cannot be upgraded at the same time as they may form a redundant pair, i.e. providing and protecting a given application service.

The virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 175, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station. In some embodiments, some signaling can be effected with the use of control system 10230 which may alternatively be used for communication between the hardware nodes 1030 and radio units 10200.

In some embodiments some or all the steps of the methods described herein may be executed in the virtualization environment 100 of FIG. 1 or in the virtualization environment 1000 of FIG. 10. For example, the virtualization environment 100, 1000 may execute a Network Function Virtualization Infrastructure (NFVI) software modification manager or part of the functionality thereof, the virtualization environment comprising processing circuitry and a memory, the memory containing instructions executable by the processor whereby the NFVI software modification manager is operative to:
 receive an NFVI software modifications request;
 send a notification that a software modification procedure of at least one Virtual
 Resource (VR) is about to start to a Virtual Network Function (VNF) level manager, the VNF level manager managing a Virtual Network Function hosted on the at least one VR hosted on the NFVI;
 apply software modifications to at least one resource of the at least one VR; and
 notify the VNF level manager about completion of the software modifications.

The NFVI software modification manager is further operative to execute any one of the methods disclosed herein.

In some embodiments, a computer-readable storage medium, has stored thereon a computer program that when executed enables an NFVI software modification manager to execute any one of the methods disclosed herein.

In some embodiments some or all the steps of the methods described herein may be executed in a cloud-based system, comprising processing circuitry and a memory, the memory containing instructions executable by the processor whereby an NFVI software modification manager is enabled and is operative to execute any one of the methods disclosed herein.

The invention claimed is:

1. A method, executed by a Virtualized Infrastructure Manager (VIM), for maintaining Virtual Network Function (VNF) service and network service availability and continuity during Network Function Virtualization Infrastructure (NFVI) software modifications of a NFVI providing at least one Virtual Resource (VR) hosting at least one VNF, comprising:
 obtaining NFVI software modifications constraints of a management and orchestration (MANO) hosted by the NFVI and of the VNF hosted by the NFVI, the constraints specifying conditions for an NFVI operation and maintenance workflow from the VNF perspective to enable the VNF to mitigate the impacts caused by the NFVI operation and maintenance;
 sending a notification that an upcoming change, that is part of the NFVI software modifications and that will impact the at least one VR, is about to start;
 applying the NFVI software modifications through the management of NFVI resources; and
 sending a notification about changes in the VRs, indicating completion of the NFVI software modifications.

2. The method of claim 1, wherein the at least one VR comprises at least one VR group.

3. The method of claim 1, further comprising, receiving the constraints from the VNF level manager (VNFM).

4. The method of claim 1, wherein the constraints comprise information which comprises an anti-affinity group.

5. The method of claim 1, further comprising, receiving an indication whether coordination of NFVI software modifications is necessary for the at least one VR.

6. The method of claim 1, further comprising identifying impacted VRs and VR groups and an order in which the NFVI software modifications can be performed based on the constraints, or the policies derived from the constraints.

7. The method of claim 1, wherein the notification that an upcoming change is about to start further comprises an indication whether the at least one VR is going to be live-migrated or shut down when the at least one VR is a virtual machine.

8. The method of claim 1 further comprising, at a same time as the notification that an upcoming change is about to start is sent, starting a timer with a determined lead time, the lead time being determined as a maximum lead time imposed by the constraints.

9. The method of claim 8, further comprising waiting the lead time before proceeding with the NFVI software modifications.

10. The method of claim 1, further comprising initiating preparations for potential disruptions caused by the NFVI software modifications and, when the at least one VR is a VR group, scaling out to increase VNF redundancy, or switching an active role from an impacted VNF to a geo-redundant pair associated with the VNF.

11. The method of claim 1, further comprising initiating preparations for potential disruptions caused by the NFVI software modifications and switching over an active role of a VNF component (VNFC) instance hosted on an impacted VR or redirecting at least a part of traffic to at least one redundant VNF component (VNFC) instance.

12. The method of claim 1, wherein when the at least one VR is a VR group, applying the NFVI software modifications comprises multiple iterations until all NFVI resources supporting the VR group have been modified and, for an anti-affinity group, the VRs impacted simultaneously in the anti-affinity group do not exceed a maximum number specified for the anti-affinity group and at least a minimum number of VRs are kept available at all times.

13. The method of claim 1, wherein sending the notification about the completion of the NFVI software modifications further comprises reversing configuration changes made in preparation to an impact, and workload rebalancing.

14. The method of claim 1 further comprising shutting down an impacted VM or migrating an impacted VM to an available compatible host.

15. A network node, operative to maintain Virtual Network Function (VNF) service and network service availability and continuity during Network Function Virtualization Infrastructure (NFVI) software modifications of a NFVI providing at least one Virtual Resource (VR) hosting at least one VNF, comprising processing circuitry and a memory, the memory containing instructions executable by the processing circuitry whereby a Virtualized Infrastructure Manager (VIM) is enabled and is-operative to:
   obtain NFVI software modifications constraints of a management and orchestration (MANO) hosted by the NFVI and of the VNF hosted by the NFVI, the constraints specifying conditions for an NFVI operation and maintenance workflow from the VNF perspective to enable the VNF to mitigate the impacts caused by the NFVI operation and maintenance;
   send a notification that an upcoming change, that is part of the NFVI software modifications and that will impact the at least one Virtual Resource (VR), is about to start;
   apply the NFVI software modifications through the management of NFVI resources; and
   send a notification about changes in the VRs, indicating completion of the NFVI software modifications.

16. A cloud-based system, operative to maintain Virtual Network Function (VNF) service and network service availability and continuity during Network Function Virtualization Infrastructure (NFVI) software modifications of a NFVI providing at least one Virtual Resource (VR) hosting at least one VNF, comprising processing circuitry and a memory, the memory containing instructions executable by the processing circuitry whereby a Virtualized Infrastructure Manager (VIM) is enabled and is operative to:
   obtain NFVI software modifications constraints of a management and orchestration (MANO) hosted by the NFVI and of the VNF hosted by the NFVI, the constraints specifying conditions for an NFVI operation and maintenance workflow from the VNF perspective to enable the VNF to mitigate the impacts caused by the NFVI operation and maintenance;
   send a notification that an upcoming change, that is part of the NFVI software modifications that will impact the at least one VR is about to start;
   apply the NFVI software modifications through the management of NFVI resources; and
   send a notification about changes in the VRs, indicating completion of the NFVI software modifications.

* * * * *